United States Patent
Marshall, IV et al.

(10) Patent No.: US 9,059,517 B2
(45) Date of Patent: Jun. 16, 2015

(54) SYSTEMS AND METHODS FOR ASSEMBLING CONFORMAL ARRAYS

(75) Inventors: Joseph A. Marshall, IV, Kent, WA (US); Joseph Lawrence Hafenrichter, Seattle, WA (US); Manny Salazar Urcia, Jr., Bellevue, WA (US); Paul Chih-Yung Chang, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 219 days.

(21) Appl. No.: 13/602,571

(22) Filed: Sep. 4, 2012

(65) Prior Publication Data
US 2014/0060733 A1    Mar. 6, 2014

(51) Int. Cl.
| B05B 1/00 | (2006.01) |
| H01Q 21/00 | (2006.01) |
| B05B 1/14 | (2006.01) |

(52) U.S. Cl.
CPC .............. *H01Q 21/0087* (2013.01); *B05B 1/14* (2013.01)

(58) Field of Classification Search
CPC ........ B05C 5/02; B05C 5/0254; B05C 5/027; B05B 13/06; B05B 13/069; B05B 13/0618; B05B 13/0627; B05B 1/00; B32B 37/1292
USPC ........... 118/302, 313, 315, 317; 141/237, 240
See application file for complete search history.

(56) References Cited

U.S. PATENT DOCUMENTS

| 4,850,818 A * | 7/1989 | Kotera .......................... 417/366 |
| 5,094,399 A * | 3/1992 | Zaber ............................ 239/135 |
| 5,584,419 A * | 12/1996 | Lasko ........................ 222/146.5 |
| 6,342,264 B1 * | 1/2002 | Raterman et al. ................ 427/8 |
| 7,046,209 B1 | 5/2006 | McCarville et al. |
| 7,109,942 B2 | 9/2006 | McCarville et al. |
| 7,109,943 B2 | 9/2006 | McCarville et al. |
| 7,113,142 B2 | 9/2006 | McCarville et al. |
| 7,610,941 B2 * | 11/2009 | Kubacki ............................ 141/8 |
| 2003/0015553 A1 * | 1/2003 | Savaria ......................... 222/160 |

OTHER PUBLICATIONS

U.S. Appl. No. 12/693,672, filed Jan. 26, 2010, McCarville et al.
U.S. Appl. No. 12/910,825, filed Oct. 24, 2010, McCarville et al.

* cited by examiner

*Primary Examiner* — Scott W Dodds
(74) *Attorney, Agent, or Firm* — DASCENZO Intellectual Property Law, P.C.

(57) ABSTRACT

Systems and methods according to the present disclosure for assembling conformal arrays utilize an outer tool for insertion into an open cell of a conformal array, an inner tool for insertion into the outer tool, and an adhesive source for delivering adhesive to the edges of the open cell via the inner tool and the outer tool. An assembled conformal array includes adhesive extending along the edges of the open cell.

28 Claims, 7 Drawing Sheets

SYSTEMS AND METHODS FOR ASSEMBLING CONFORMAL ARRAYS

FIELD

The present disclosure relates to conformal arrays.

BACKGROUND

Conformal arrays are antennas that are configured to receive and/or transmit radio signals. Conformal arrays are a type of phased array antenna and typically are constructed to have a low profile compared to an externally mounted non-conformal array antenna. For example, conformal arrays typically are constructed for mounting to or integrating into an aircraft, a vehicle, a building, or other structure, in which a typical antenna may not be desirable, for example, due to aerodynamics or conspicuity of a typical antenna.

SUMMARY

Systems and methods according to the present disclosure for assembling conformal arrays utilize an outer tool for insertion into an open cell of a conformal array, an inner tool for insertion into the outer tool, and an adhesive source for delivering adhesive to the edges of the open cell via the inner tool and the outer tool. An assembled conformal array includes adhesive extending along the edges of the open cell. The outer tool defines a cavity configured to receive the inner tool, and a pathway that is configured to distribute the adhesive from the inner tool to the edges of the open cell. The inner tool defines a conduit that is configured to receive the adhesive from the adhesive source and deliver it to the pathway of the outer tool.

DESCRIPTION

Figure 1:
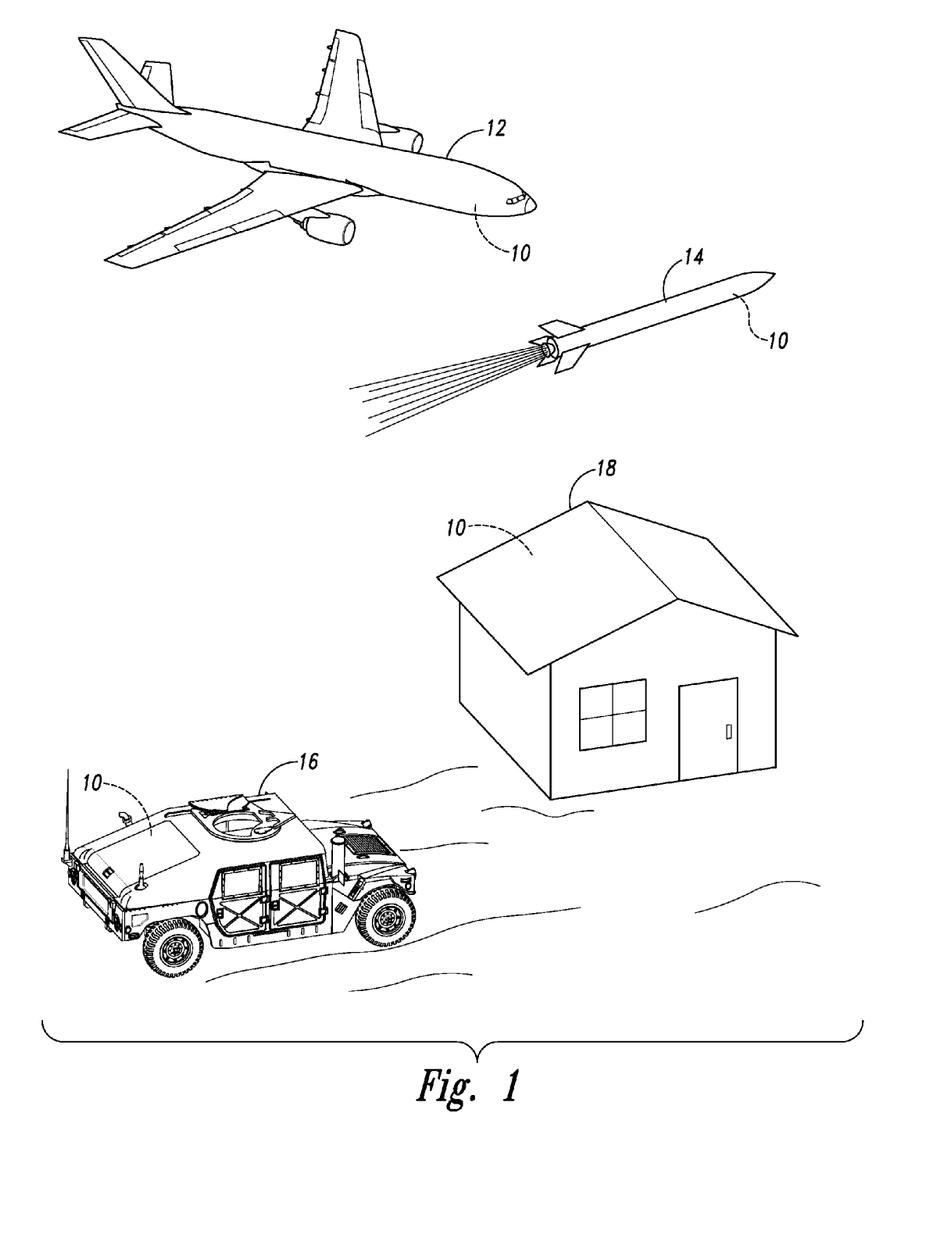
FIG. 1 is an illustration depicting various apparatuses that may include conformal arrays assembled according to systems and/or methods according to the present disclosure.

Conformal arrays and systems and methods for assembling conformal arrays are disclosed herein. Conformal arrays assembled by a system or a method according to the present disclosure may take any suitable form, may be used for any suitable application, and are referred to herein as conformal arrays 10. Conformal arrays 10 additionally or alternatively may be described as or referred to as conformal antennas 10. FIG. 1 illustrates an aircraft 12, a missile 14, a land vehicle 16, and a building 18, each of which may include a conformal array 10; however, other apparatuses other than those illustrated in FIG. 1 also may include conformal arrays 10.

Figure 2:
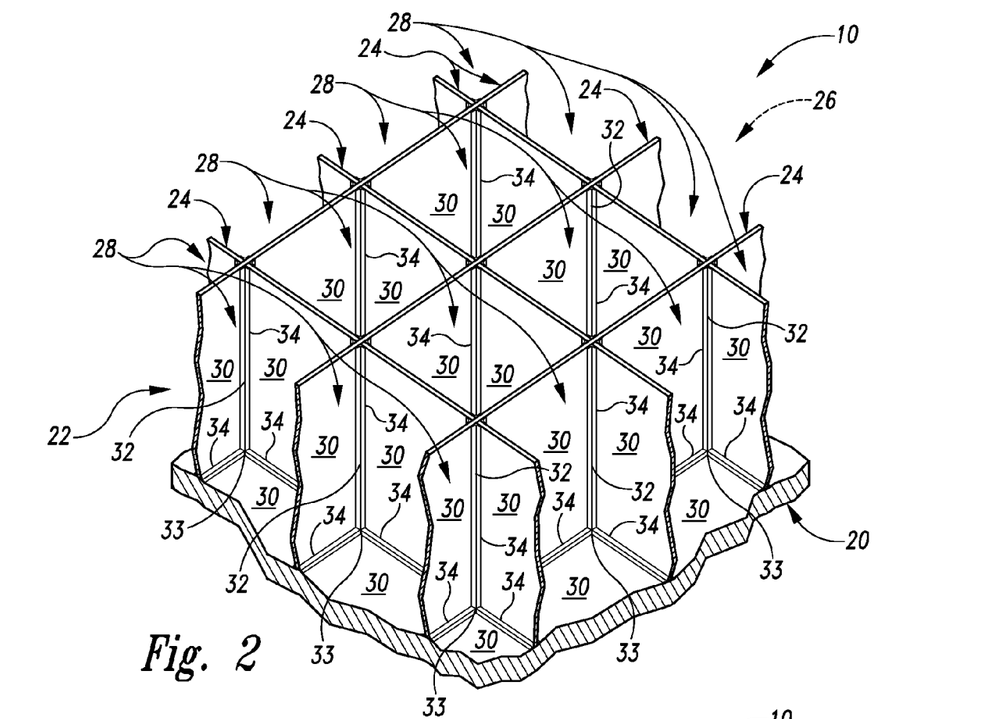
FIG. 2 is an isometric view of a portion of an illustrative, non-exclusive example of a conformal array.

FIG. 2 illustrates a portion of a conformal array 10. As illustrated, a conformal array 10 includes a structural back skin 20, to which a core 22 is attached. The core 22 includes a plurality of strips 24 that include radiating elements 26. The structural back skin 20 and the core 22 collectively define a plurality of open cells 28. In the illustrated example, the open cells 28 have perpendicular cross-sectional profiles that are rectangular; however, any suitable shape of open cells 28 may be utilized. Each open cell is defined by inner faces 30, with adjacent inner faces 30 defining edges 32 of the open cells 28 and with the edges 32 intersecting at corners 33. In the illustrated example, the open cells 28 define rectangular prismatic volumes. Accordingly, in the illustrated example, each open cell 28 includes eight edges 32 and four corners 33; however, other configurations are within the scope of the present disclosure.

The structural back skin 20 and core 22 may take any suitable form depending on a desired application for a conformal array 10. For example, a structural back skin 20 may be generally planar, may be associated with a conformal radome, or it may be contoured to correspond to a corresponding contoured structure of an apparatus into which the conformal array 10 is to be affixed or integrated.

Figure 3:
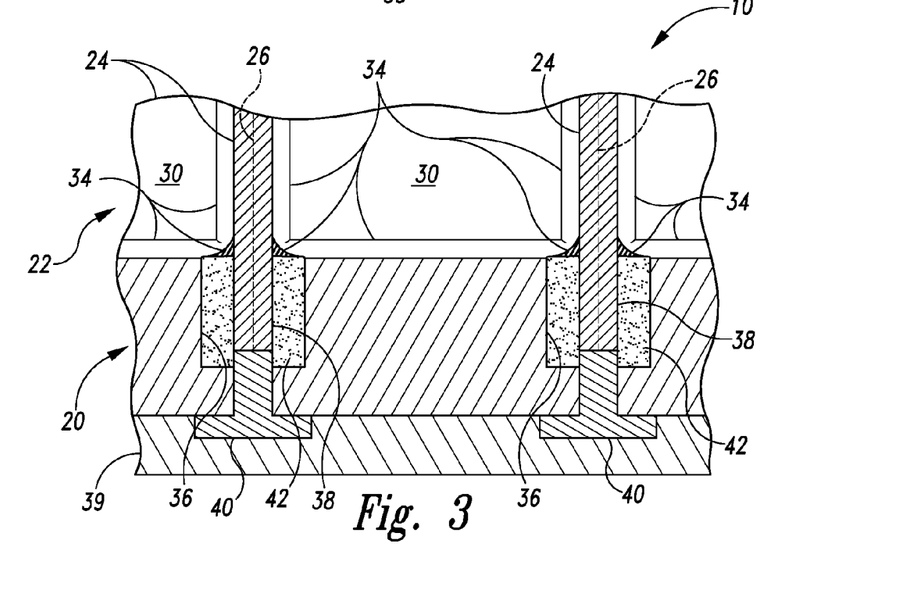
FIG. 3 is a cross-sectional side view of a portion of the conformal array of FIG. 2.

As seen in FIGS. 2-3, an adhesive 34 extends along the edges 32 of the open cells 28, thereby securing the core 22 to the structural back skin 20 and securing the strips 24 to each other. As perhaps best seen in FIG. 3 in cross-section, the adhesive 34 may be described as defining fillets of adhesive 34 between adjacent inner faces 30 and/or along edges 32 of the open cells 28.

As seen in FIG. 3, the structural back skin 20 defines a plurality of vias, or holes, 36, into which projections 38 of the strips 24 extend. The conformal array 10 includes a circuit board 39 having corresponding catch pads 40 extending into the vias 36 from the underside of the structural back skin 20 for electrical connection with the radiating elements 26 of the core 22. A conductive adhesive 42 may be used within the vias 36 to further secure the core 22 to the structural back skin 20 and to ensure a satisfactory electrical connection between the catch pads 40 and the radiating elements 26.

Figure 4:
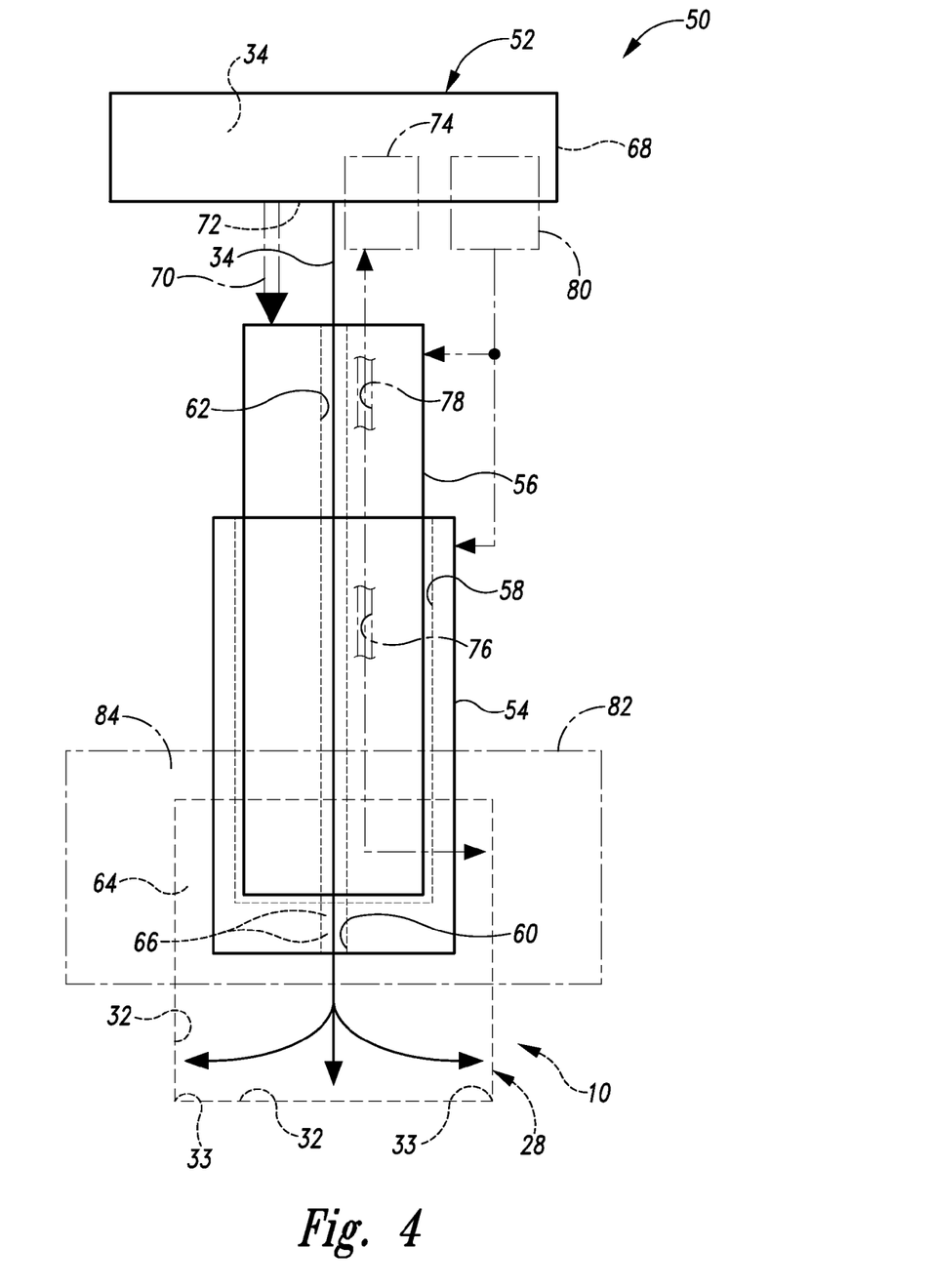
FIG. 4 is a schematic diagram representing systems for assembling conformal arrays.

FIG. 4 schematically represents systems 50 for assembling conformal arrays 10. Systems 50 additionally or alternatively may be described as or referred to as manufacturing systems 50, assembling systems 50, kits 50, manufacturing kits 50, or assembly kits 50 for assembling conformal arrays 10. In FIG. 4, systems 50 are schematically illustrated with respect to a single open cell 28, schematically represented by a dashed box in FIG. 4; however, as discussed herein, systems 50 may be used or otherwise configured for simultaneous use with a plurality of open cells 28, including all of the open cells 28 of a conformal array 10 or a subset of open cells 28 of a conformal array 10. Accordingly, when discussing the components of a system 50 that correspond to an open cell 28, more than one of such component may be included in or utilized by a system 50.

As schematically illustrated by the solid boxes in FIG. 4, systems 50 include at least an adhesive source 52, an outer tool 54, and an inner tool 56. The adhesive source 52 is for supplying adhesive 34 to the edges 32 of the open cell 28. The outer tool 54 is configured to be inserted into the open cell 28 and defines a cavity 58 and a pathway 60 configured to distribute adhesive 34 from the adhesive source 52 to the edges 32 of the open cell 28. The inner tool 56 is configured to be inserted into the cavity 58 of the outer tool 54 and defines a conduit 62 configured to receive adhesive 34 from the adhesive source 52 and to deliver the adhesive 34 to the pathway 60 of the outer tool 54. Outer tools 54 and inner tools 56 additionally or alternatively may be described as outer mandrels 54 and inner mandrels 56, respectively.

In some embodiments, the outer tool 54 is constructed of a different material than the inner tool 56. In some embodiments, the outer tool 54 has a static coefficient of friction that is less than a static coefficient of friction of the inner tool 56, for example with respect to the core 22. Minimal friction between the outer tool 54 and the inner faces 30 of the open cell 28 may be desired, not only to prevent damage to the core 22 of the conformal array 10, but also to reduce tooling preparation (e.g., cleaning and application of a release agent) and to increase the effective lifetime of the outer tool 54 (i.e., to avoid frequent replacement of the outer tool 54 due to wear).

In some embodiments, the outer tool 54 has a modulus of elasticity that is less than a modulus of elasticity of the inner tool 56. As illustrative, non-exclusive examples, the outer tool 54 may have a modulus of elasticity that is less than one of 10, 5, 1, 0.5, 0.1, or 0.01 GPa. Additionally or alternatively, the outer tool 54 may have a coefficient of thermal expansion that is greater than a coefficient of thermal expansion of the inner tool 56. As illustrative, non-exclusive examples, the outer tool 54 may have a volumetric coefficient of thermal expansion at 20° C. that is greater than one of 50, 75, 100, 125, 150, 175, or $200 \times 10^{-6}$/° C.

In some embodiments, the outer tool 54 is more flexible than the inner tool 56. Additionally or alternatively, the outer tool 54 may be more resilient than the inner tool 56. As illustrative, non-exclusive examples, the outer tool 54 may be constructed of one or more of Polytetrafluoroethylene, ultra-high-molecular-weight polyethylene, and/or silicone, and the inner tool 56 may be constructed of a metal, such as aluminum. In some embodiments, the outer tool 54 may be described as self-lubricating and/or may be constructed of self-lubricating material or materials.

In some embodiments, the outer tool 54 is configured to operatively engage the inner faces 30 of the open cell 28 when the outer tool 54 is operatively positioned within the open cell 28. In some such embodiments, the outer tool 54 is configured to operatively seal against the inner faces 30 of the open cell 28 when the outer tool 54 is operatively positioned within the open cell 28. In other words, the outer tool 54 itself may seal against, or may form a seal with, the inner faces 30 of the open cell 28 without the system 50 including one or more sealing members that are separate and distinct from the outer tool 54, such as O-rings, gaskets, or the like. In some embodiments, the outer tool 54 may be described as having a perpendicular cross-sectional outer profile that generally corresponds to a perpendicular cross-sectional profile of the open cell 28. In some embodiments, the perpendicular cross-sectional outer profile of the outer tool 54 may generally be polygonal, such as generally rectangular.

In some embodiments, the outer tool 54 is configured to not engage the edges 32 of the open cell 28 when the outer tool 54 is operatively positioned within the open cell 28. Accordingly, when the outer tool 54 is operatively positioned within the open cell 28 with an outer surface of the outer tool 54 engaging the inner faces 30 of the open cell 28, a series of voids 64 may be defined by the inner faces 30 of the open cell 28 and the outer tool 54, with the voids 64 extending along the edges 32 of the open cell 28. In the illustrative, non-exclusive example of an open cell 28 defining a rectangular prismatic volume, the outer tool 54 and the inner faces 30 collectively define eight voids 64. Voids 64 additionally or alternatively may be described as fillet channels 64.

In embodiments in which the perpendicular cross-sectional outer profile of the outer tool 54 is generally polygonal, the vertices of the generally polygonal profile may be rounded or truncated along a length of the outer tool 54. For example, the rounded or truncated vertices may extend along an entire length of the outer tool 54. Alternatively, the rounded or truncated vertices may extend along less than the entire length of the outer tool 54. As illustrative, non-exclusive examples, the rounded or truncated vertices may extend along at least 20%, 40%, 60%, 80%, or 100% of the length of the outer tool 54 and/or for less than 20%, 40%, 60%, 80%, or 100% of the length of the outer tool 54. Additionally or alternatively, when the outer tool 54 is operatively positioned within the open cell 28, the voids 64 may extend from the back skin 20 along at least 20%, 40%, 60%, 80%, or 100% and/or for less than 20%, 40%, 60%, 80%, or 100% of a depth of the open cell 28.

The pathway 60 of the outer tool 54 may include one or more channels 66 that fluidly interconnect the cavity 58 of the outer tool 54 to the voids 64 when the outer tool 54 is operatively positioned within the open cell 28. For example, when the outer tool 54 is operatively positioned within the open cell 28, the channels 66 may be positioned or otherwise configured to extend from the cavity 58 to the corners 33 of the open cell 28. Accordingly, when the outer tool 54 is operatively positioned within the open cell 28 and the inner tool 56 is operatively positioned within the cavity 58 of the outer tool 54, the voids 64 may be fluidly interconnected with the pathway 60 of the outer tool 54 and the conduit 62 of the inner tool.

In some embodiments, a system 50 may include a pressure distribution plate 68 that is configured to selectively and operatively urge the outer tool 54 into operative engagement with the structural back skin 20 of the conformal array 10. Additionally or alternatively, the pressure distribution plate 68 may be configured to operatively urge the outer tool 54 into operative engagement with the inner faces 30 of the open cell 28. In some embodiments, such as schematically indicated in FIG. 4 at 70, the pressure distribution plate 68 may be configured to selectively and operatively push against the inner tool 56, which in turn pushes against the outer tool 54, and thus is urged into operative engagement with the open cell 28. When present, the pressure distribution plate 68 may selectively urge the outer tool 54 in any suitable manner. For example, the weight of the pressure distribution plate 68 may urge the outer tool 54 against the inner faces 30. Additionally or alternatively, the pressure distribution plate 68 may be electronically, mechanically, hydraulically, and/or pneumatically mechanized to urge the outer tool 54 against the inner faces 30. Other configurations also are within the scope of the present disclosure.

In some embodiments, the pressure distribution plate 68 may define an engagement region 72 that is configured to selectively receive and mate with a portion of the inner tool 56. As an illustrative, non-exclusive example, the engagement region 72 may define a recess in the pressure distribution plate 68, with the recess being specifically shaped to receive and mate with a portion of the inner tool 56. For example, a tapered engagement region 72 or an engagement region 72 in the shape of a truncated cone may be used to mate with a tapered end region of the inner tool 56.

In some embodiments, such as schematically indicated in FIG. 4, the adhesive source 52 may include the optional pressure distribution plate 68. Accordingly, the pressure distribution plate 68 may be described as or referred to as an adhesive manifold 68. In such embodiments, when the pressure distribution plate 68 is operatively engaged with the inner tool 56, the pressure distribution plate 68 may selectively deliver adhesive 34 from the adhesive source 52 to the conduit 62 of the inner tool 56.

In some embodiments, the pressure distribution plate 68 and the inner tool 56 may be coupled together as a single tooling member. In such embodiments, the adhesive source 52 may be fluidly interconnected with the conduit 62 of the inner tool 56 at all times.

As schematically represented in FIG. 4 by a dash-dot box, a system 50 optionally may include a pneumatic arrangement 74 that is configured to facilitate delivery of the adhesive 34 from the adhesive source 52 to the voids 64 via the conduit 62 of the inner tool 56 and the pathway 60 of the outer tool 54 when the outer tool 54 is operatively positioned within the open cell 28 and the inner tool 56 is operatively positioned within the cavity 58 of the outer tool 54. For example, in some embodiments, the pneumatic arrangement 74 is configured to selectively decrease air pressure within the voids 64 to selectively draw adhesive 34 through the conduit 62 and the pathway 60 into the voids 64. To facilitate the drawing of air, the outer tool 56 may define passages 76 that are configured to selectively interconnect the pneumatic arrangement 74 with the voids 64. The passages 76, when present, may be separate and distinct from the cavity 68 of the outer tool 54. In some embodiments, depending on the configuration of outer tool 54 and inner tool 56, the inner tool 56 and/or the optional pressure distribution plate 68 also may define passages 78 that are configured to fluidly interconnect with the passages 76 of the outer tool 54 when the inner tool 56 is operatively positioned within the cavity 58 of the outer tool 54.

In some embodiments, the optional pneumatic arrangement 74 also may be configured to selectively facilitate the outer tool 54 sealing against the inner faces 30 of the open cell 28. For example, in embodiments in which the outer tool 54 is flexible, the reduction in air pressure within the voids 64 will facilitate the expansion of the outer tool 54 within the open cell 28, thereby urging the outer surface of the outer tool 54 into operative or sealing engagement with the inner faces 30 of the open cell 28.

In some embodiments, the optional pneumatic arrangement 74 may be configured, or used, to selectively facilitate removal of the outer tool 54 from the open cells 28. For example, the pneumatic arrangement 74 may be configured to selectively increase air pressure within the voids 64. In embodiments in which the outer tool 54 is flexible, the increase in air pressure within the voids 64 will urge the outer tool 54 away from the inner faces 30 of the open cell 28, thereby enabling removal of the outer tool 54 from the open cell 28 with minimal or no contact or friction between the outer tool 54 and the open cell 28.

In FIG. 4, the box representing the pneumatic arrangement 74 is illustrated overlapping the adhesive source 52 and the optional pressure distribution plate 68, schematically representing that the pneumatic arrangement 74 may (but is not required to) share a common housing with the adhesive source 52 and/or the pressure distribution plate 68. Additionally or alternatively, in some embodiments the pneumatic arrangement 74 may include the pressure distribution plate 68.

As schematically represented by a dash-dot box in FIG. 4, a system 50 optionally may include a heating arrangement 80 that is configured to selectively heat the outer tool 54, for example, to facilitate the selective expansion of the outer tool 54 within the open cell 28 and thus to facilitate the selective sealing of the outer tool 54 against the inner faces 30 of the open cell 28. After delivery of adhesive 34 to the voids 64, and curing of the adhesive 34, the outer tool 54 may be cooled, thereby shrinking, or retracting, away from the inner faces 30 of the open cell 28.

The heating arrangement 80, when present, may take any suitable form. In some embodiments, as optionally and schematically illustrated in FIG. 4, the heating arrangement 80 may be configured to heat the inner tool 56, which in turn will heat the outer tool 54 via conduction when the inner tool 56 is operatively positioned within the cavity 58 of the outer tool 54. In some embodiments, the heating arrangement 80 may heat the inner tool 56 by induction heating.

As schematically and optionally illustrated by the dash-dot box in an overlapping relationship with the outer tool 54 and the inner tool 56, some systems 50 optionally may include a tooling frame 82 that defines an opening 84 that corresponds to the outer shape of the outer tool 54. That is, the opening 84 may have a perpendicular cross-sectional profile that corresponds with the perpendicular cross-sectional profile of the open cell 28 and with a perpendicular cross-sectional outer profile of the outer tool 54. Accordingly, the tooling frame 82 may be operatively positioned adjacent to the core 22 opposite the structural back skin 20 with the opening 84 in alignment with the open cell 28. As a result, the opening 84 may provide for selective receipt of the outer tool 54 and for selective precise insertion of the outer tool 54 into the open cell 28. Accordingly, the tooling frame 82 may facilitate operative insertion and removal of the outer tool 54 into and out of the open cell 28 without damage to, or unnecessary friction with, the core 22. Stated differently, the opening 84 may be configured to selectively receive the outer tool 54 for insertion and removal of the outer tool 54 into and out of the open cell 28 without distortion of the core 22 relative to the structural back skin 20. Additionally or alternatively, the tooling frame 82 may be configured to selectively maintain appropriate positioning of the core 22 relative to the structural back skin 20 and the outer tool 54 relative to the open cell 28. Additionally or alternatively, the tooling frame 82 may restrict or even prevent disbonding of the conductive adhesive 42 from the structural back skin 20, the core 22, and/or the catch pads 40 during assembly of conformal arrays 10.

As discussed, some systems 50 may be configured for use with more than one open cell 28 at a time. Accordingly, a system 50 may include a plurality of outer tools 54, with each outer tool 54 being configured to be inserted into a respective open cell 28, and a plurality of inner tools 56 corresponding to the outer tools 54, with each inner tool 56 being configured to be inserted into the cavity 58 of a respective outer tool 54. In some embodiments, the outer tools 54 may be coupled together as a single tooling member. For example, multiple outer tools 54 may define a rectangular array corresponding to a rectangular array of open cells 28 of a conformal array 10. When coupled together as a single tooling member, they may be inserted into and extracted from the open cells 28 simultaneously. Such configurations may facilitate efficient assembly of a conformal array 10 that includes multiple open cells 28. Additionally or alternatively, the assembly of a conformal array 10 may be mechanized for efficient manufacturing of conformal arrays, for example utilizing mechanical, hydraulic, pneumatic, and/or electrical systems for the automation of assembly. Additionally or alternatively, the simultaneous insertion or extraction of multiple outer tools 54 to and from multiple open cells 28 may restrict or even prevent unwanted forces on the core 22 of the conformal array 10.

Additionally or alternatively, multiple inner tools 56 may be coupled together as a single tooling member, with the multiple inner tools 56 optionally defining a rectangular array corresponding to a rectangular array of open cells 28 of a conformal array 10. In some such embodiments, the rectangular array of outer tools 54 and/or the rectangular array of inner tools 56 may correspond to all of the open cells 28 of a conformal array or they may correspond to a subset of the open cells 28 of a conformal array 10. In the latter example, during assembly of a conformal array 10, the use of the tooling members may be used sequentially to operatively couple sections of the core 22 to the structural back skin 20. As discussed with respect to the outer tools 54, such configurations may facilitate efficient assembly of a conformal array 10, including the use of mechanical, hydraulic, pneumatic, and/or electrical systems for the automation of assembly.

In embodiments of systems 50 that include a tooling frame 82, the tooling frame 82 may include a plurality of openings 84 corresponding to the optional use of a plurality of outer tools 54 and a plurality of inner tools 56, with each opening 84 of the tooling frame 82 being configured to selectively receive a respective outer tool 54 for precise insertion of the respective outer tool 54 into a respective open cell 28. Such a configuration may facilitate efficient assembly of a conformal array 10, mechanizing the assembly of conformal arrays, as discussed herein.

Turning now to FIGS. 5-10, illustrative non-exclusive examples of systems 50 are illustrated. Where appropriate, the reference numerals from the schematic illustrations of FIGS. 2-4 are used to designate corresponding parts of systems 50; however, the examples of FIGS. 5-10 are non-exclusive and do not limit systems 50 to the illustrated embodiments of systems 50. That is, systems 50 are not limited to the specific embodiments of FIGS. 5-10, and systems 50 may incorporate any number of the various aspects, configurations, characteristics, properties, etc. of systems 50 that are illustrated in and discussed with reference to the schematic representations of FIGS. 2-4 and/or the embodiments of FIGS. 5-10, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the embodiments of FIGS. 5-10; however, it is within the scope of the present disclosure that the previously discussed features, variants, etc. may be utilized with the embodiments of FIGS. 5-10.

Somewhat less schematically than FIG. 4, FIGS. 5-8 illustrate an example of a system 50 with this example indicated generally at 100 and identified herein as system 100. In FIGS. 5-8, system 100 is illustrated in connection with a single open cell 28 of a conformal array 10; however, system 100 also may be used with multiple open cells 28 of a conformal array 10, as discussed herein. System 100 includes an outer tool 54, an inner tool 56 and an adhesive source 52.

Figure 5:
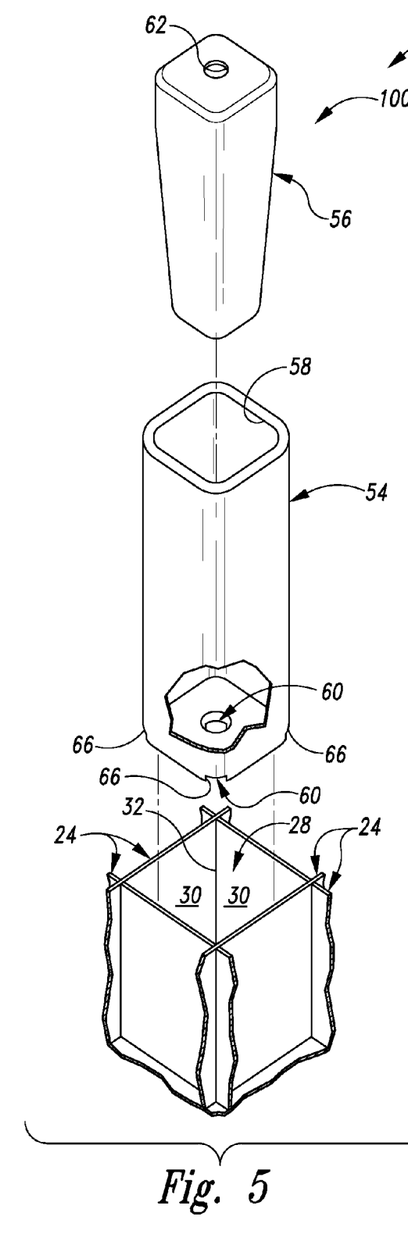
FIG. 5 is an exploded isometric view of an illustrative, non-exclusive example of a system for assembling a conformal array.
Figure 8:
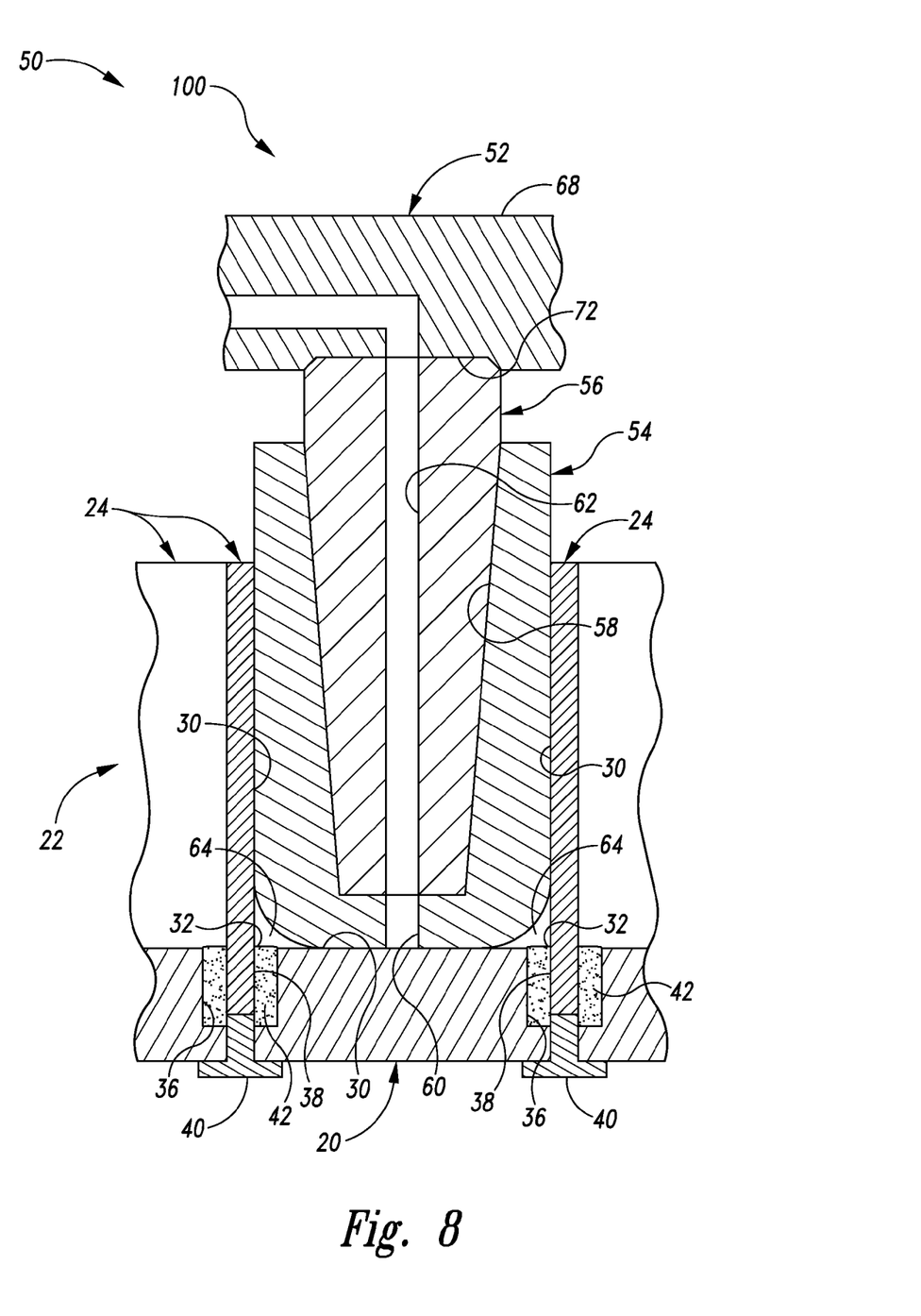
FIG. 8 is a cross-sectional side view of the system illustrated in FIG. 5, also with the inner tool positioned within the outer tool and the outer tool positioned within an open cell of a conformal array to be assembled.

As best seen in FIGS. 5 and 8, the inner tool 56 has a tapered body, and the cavity 58 of the outer tool 54 is correspondingly tapered to operatively receive the inner tool 56, as illustrated in an assembled condition in FIG. 8. The outer tool 54 of system 100 has a perpendicular cross-sectional outer profile that is generally square, corresponding to a square perpendicular cross-section profile of the open cell 28; however, the vertices, of the outer tool's profile are curved, so that voids 64 are defined along the edges 32 of the open cell 28.

The adhesive source 52 of system 100 includes a pressure distribution plate 68 that defines an engagement region 72 in the form of a tapered recess that corresponds to and that is configured to mate with a tapered end region of the inner tool 56, as best seen in FIG. 8.

Figure 6:
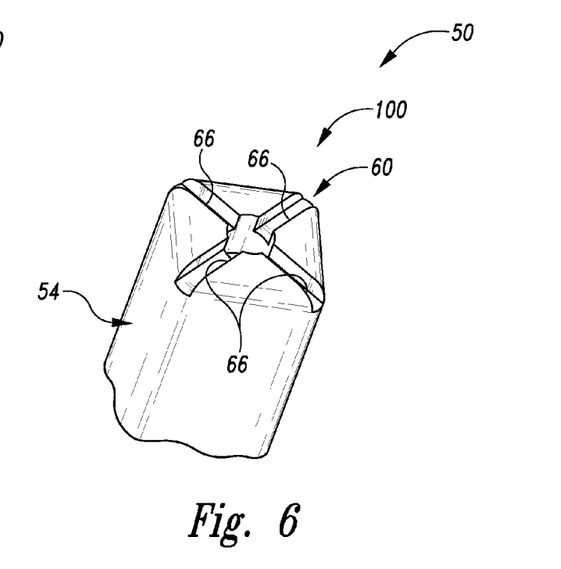
FIG. 6 is an isometric view of a portion of the outer tool of the system illustrated in FIG. 5.
Figure 7:
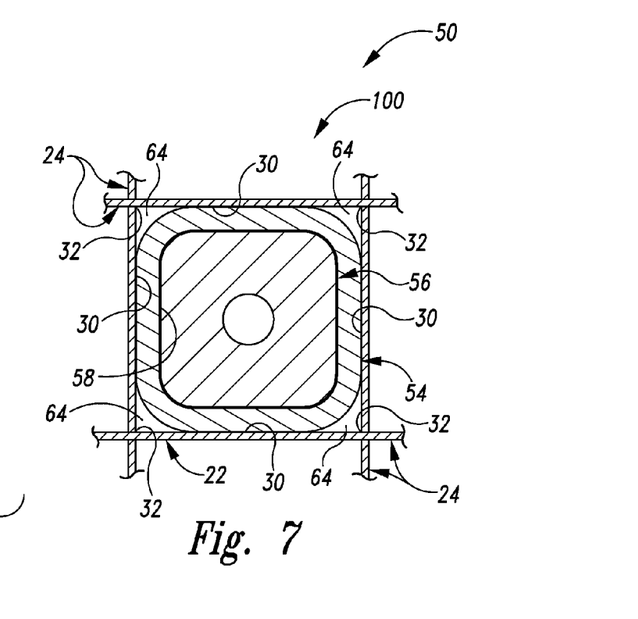
FIG. 7 is a cross-sectional plan view of the system illustrated in FIG. 5, with the inner tool positioned within the outer tool and the outer tool positioned within an open cell of a conformal array to be assembled.

With reference to FIGS. 5-6, the pathway 60 of the outer tool 54 of system 100 defines four channels 66 that fluidly interconnect the cavity 58 of the outer tool 54 with the corners 33 and thus the edges 32 of the open cell 28 when the outer tool 54 is operatively positioned within the open cell 28, such as illustrated in FIG. 8.

As perhaps best understood with reference to FIGS. 5 and 8, in use, the outer tool 54 is inserted into the open cell 28, the inner tool 56 is inserted into the cavity 58 of the outer tool 54, and the pressure distribution plate 68 engages the inner tool 56. When the component parts are appropriately positioned, the adhesive source 52 may deliver adhesive 34 to the voids 64 via the conduit 62 and the channels 66 of the pathway 60.

Figure 9:
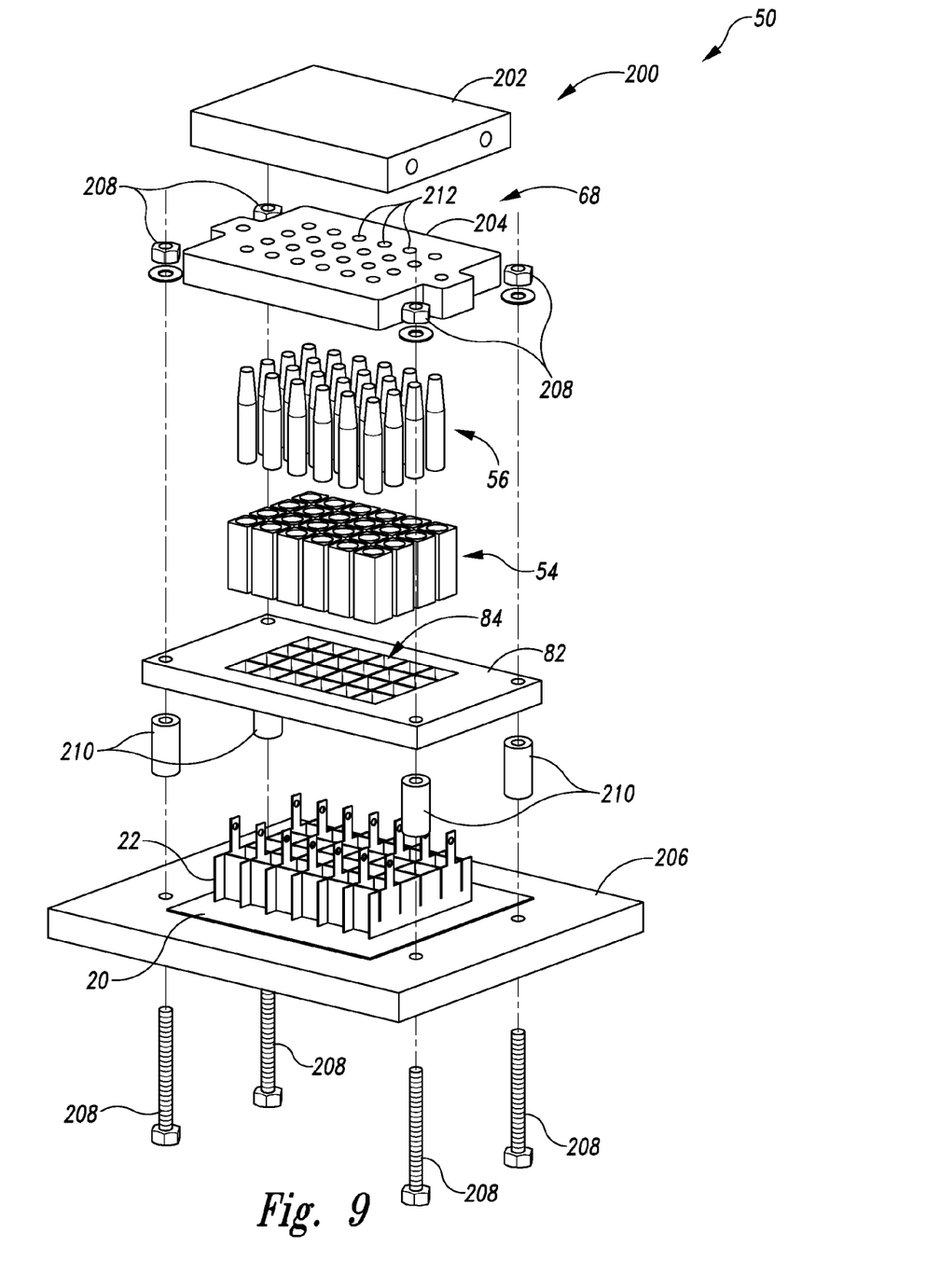
FIG. 9 is an exploded isometric view of another illustrative, non-exclusive example of a system for assembling a conformal array.

FIG. 9 illustrates another illustrative, non-exclusive example of a system 50, with this example indicated at 200 and referred to herein as system 200. System 200 is an example of a system 50 that includes multiple outer tools 54, multiple inner tools 56, and a tooling frame 82 having multiple openings 84 that correspond to the number of outer tools 54 and inner tools 56.

System 200 also includes a pressure distribution plate 68, with the pressure distribution plate 68 of system 200 having a two-part construction. As seen in FIG. 9, the pressure distribution plate 68 of system 200 includes an upper portion 202 and a lower portion 204 that collectively define a manifold for delivery of adhesive 34 to the conduits 62 of the inner tools 56.

System 200 also includes a jig base 206 for supporting the structural back skin 20 during the assembly process of the conformal array 10. In use, the structural back skin 20 is positioned on the jig base 206, conductive adhesive 42 is delivered to the vias 36 of the structural back skin 20, and the core 22 is operatively positioned on the structural back skin 20 with the projections 38 of the core 22 extending into the vias 36. The tooling frame 82 is then secured over the core 22 with fasteners 208, with the openings 84 of the tooling frame 82 being precisely aligned with the open cells 28. Spacers 210 are used between the jig base 206 and the tooling frame 82 to appropriately position the tooling frame 82 relative to the core 22. In some embodiments of system 200, the tooling frame 82, when installed, may be spring-biased toward the jig base 206, so as to apply a predetermined pressure against the core 22, maintaining it in a desired position during the assembly process of the conformal array 10 and allowing for compression of the joint between the core 22 and the structural back skin 20. This stabilization of the core 22 relative to the structural back skin 20 aids in creating the electrical interconnection between the radiating elements 26 of the core 22 and the circuit board 39 during the curing of the conductive adhesive 42.

After the tooling frame 82 is appropriately positioned, the outer tools 54 are inserted through the openings 84 of the tooling frame 82 and into the open cells 28. The inner tools 56 are then inserted into the cavities 58 of the outer tools 54. Alternatively, the inner tools 56 may be inserted into the cavities 58 of the outer tools 54 prior to the outer tools 54 being inserted through the openings 84 of the tooling frame 82 and into the open cells 28. Next, the pressure distribution plate 68 is appropriately positioned against the inner tools 56 so that the delivery ports 212 of the lower portion 204 are appropriately aligned with the conduits 62 of the inner tools 56. Adhesive 34 may then be delivered to the voids 64 defined between the outer tools 54 and the edges 32 of the open cells 28.

Figures 10, 11:
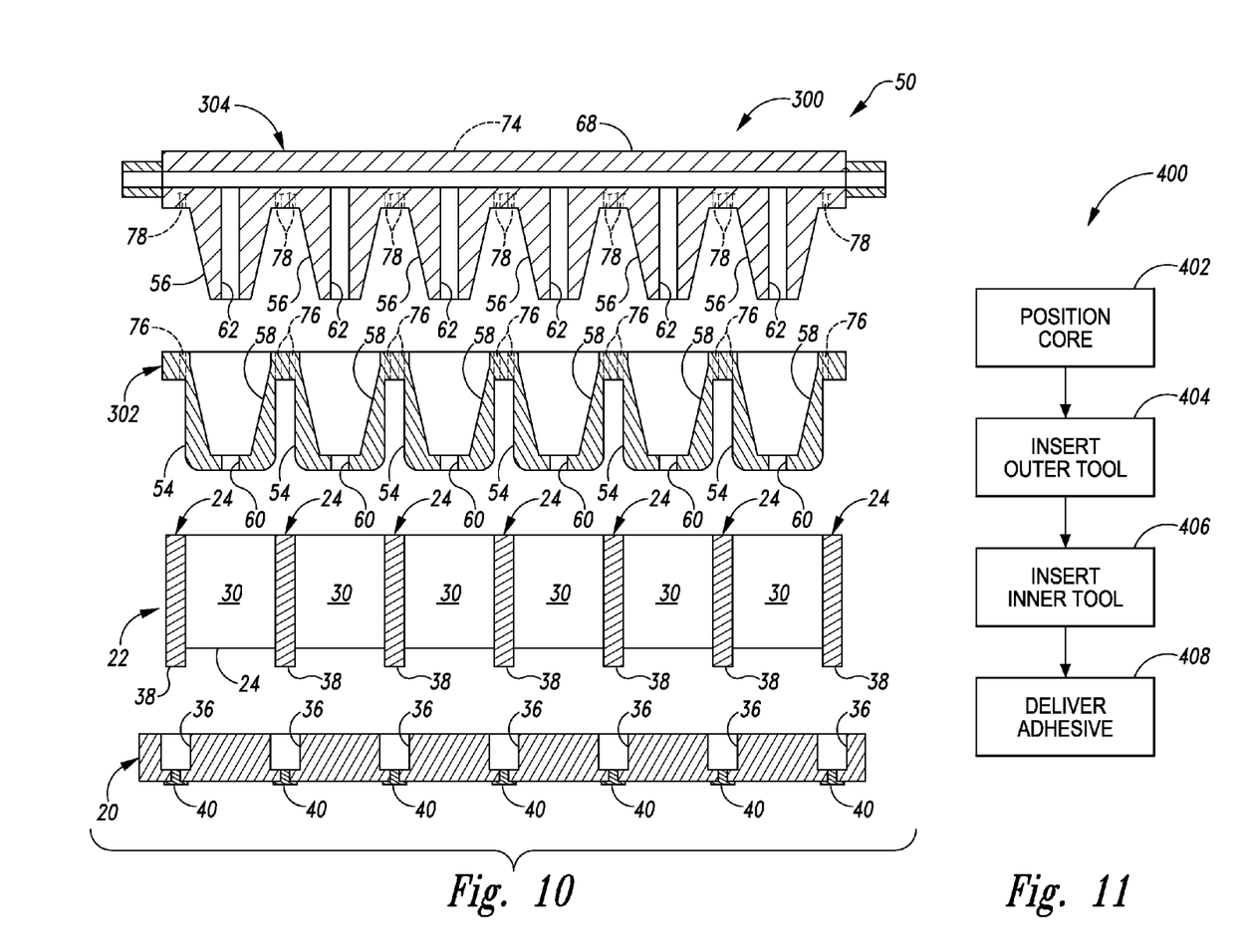
FIG. 10 is an exploded cross-sectional side view of another illustrative, non-exclusive example of a system for assembling a conformal array.
FIG. 11 is a flow chart that schematically represents methods of assembling conformal arrays.

FIG. 10 illustrates yet another illustrative, non-exclusive example of a system 50, with this example indicated at 300 and referred to herein as system 300. System 300 also is an example of a system 50 that includes multiple outer tools 54 and multiple inner tools 56. In system 300, however, the outer tools 54 are coupled together to collectively form a single tooling member 302, and the inner tools 56 are coupled together with the pressure distribution plate 68 to collectively form a single tooling member 304. In FIG. 10, a series of passages 76 and passages 78 is schematically illustrated in dashed lines, as extending through the tooling member 302 and tooling member 304, respectively, schematically illustrating that system 300 may incorporate a pneumatic arrangement 74 with the passages 76 and passages 78 being aligned with the voids 64 defined between the outer tools 54 and the edges 32 of the open cells 28 when the tooling member 302 and the tooling member 304 are appropriately positioned relative to the core 22.

FIG. 11 schematically provides a flowchart that represents illustrative, non-exclusive examples of methods 400 according to the present disclosure. The methods and steps illustrated in FIG. 11 are not limiting and other methods and steps are within the scope of the present disclosure, including methods having greater than or fewer than the number of steps illustrated, as understood from the discussions herein.

Methods 400 may include the steps of positioning a core 22 relative to and into engagement with a structural back skin 20, as indicated at 402, inserting one or more outer tools 54 into corresponding open cells 28, as indicated at 404, inserting one or more inner tools 56 into corresponding cavities 58 of the outer tools 54, as indicated at 406, and delivering adhesive 34 to the edges 32 of the open cells 28, as indicated at 408.

In some methods 400, the inserting 402 may include appropriately positioning projections 38 of the core 22 into vias 36 of the structural back skin 20. Moreover, in some methods 400, the inserting 402 may include, be followed by, or preceded by delivering conductive adhesive 42 into the vias 36, followed by curing the conductive adhesive 42.

In connection with embodiments of systems 50 that include a tooling frame 82, inserting 404 and inserting 406 may include or be preceded by appropriate positioning of a tooling frame 82 relative to the core 22.

In some methods 400, the inserting 404 may include or be followed by expanding the outer tool 54 so that the outer surfaces of the outer tool 54 engage, and optionally seal against, the inner faces 30 of the open cell 28. In connection with embodiments of systems 50 that include a heating arrangement 78, the optional expanding may include heating the outer tool 54, such as by inductive heating of inner tool 56.

In connection with embodiments of systems 50 that include a pneumatic arrangement 74, the delivering 408 may include drawing the adhesive 34 along the voids 64 via the pathways 60 of the outer tool 54, such as by reducing the air pressure within the voids 64.

In connection with embodiments of systems 50 that include multiple outer tools 54 and inner tools 56, the outer tools 54 and the inner tool 56 may be utilized sequentially with subsets of the open cells 28 of a conformal array 10.

In some methods 400, the delivering 408 may be preceded by filling the conduit 62 of the inner tool 56 with a preselected volume of uncured adhesive 34, with the preselected volume corresponding to an amount of adhesive 34 necessary to fill the respective voids 64.

Illustrative, non-exclusive examples of inventive subject matter according to the present disclosure are described in the following enumerated paragraphs:

A. A system (or kit) for assembling a conformal array, wherein the conformal array includes a structural back skin and a core connected to the structural back skin, wherein the core includes radiating elements that are electrically interconnected with a circuit board opposite the structural back skin, and wherein the structural back skin and the core collectively define an open cell having edges defined by adjacent inner faces of the open cell, the system comprising:

an adhesive source for supplying adhesive to the edges of the open cell;

an outer tool configured to be inserted into the open cell, wherein the outer tool defines a cavity and a pathway configured to distribute adhesive from the adhesive source to the edges of the open cell; and an inner tool configured to be inserted into the cavity of the outer tool, wherein the inner tool defines a conduit configured to receive adhesive from the adhesive source and to deliver adhesive to the pathway of the outer tool.

A1. The system of paragraph A, wherein the outer tool is constructed of a different material than the inner tool.

A2. The system of any of paragraphs A-A1, wherein the outer tool has a static coefficient of friction that is less than a static coefficient of friction of the inner tool.

A3. The system of any of paragraphs A-A2, wherein the outer tool has a modulus of elasticity that is less than a modulus of elasticity of the inner tool.

A4. The system of any of paragraphs A-A3, wherein the outer tool has a modulus of elasticity that is less than one of 10, 5, 1, 0.5, 0.1, or 0.01 GPa.

A5. The system of any of paragraphs A-A4, wherein the outer tool has a volumetric coefficient of thermal expansion that is greater than a volumetric coefficient of thermal expansion of the inner tool.

A6. The system of any of paragraphs A-AA5, wherein the outer tool has a volumetric coefficient of thermal expansion at 20° C. that is greater than one of 50, 75, 100, 125, 150, 175, or $200 \times 10^{-6}/°$ C.

A7. The system of any of paragraphs A-A6, wherein the outer tool is more flexible than the inner tool.

A8. The system of any of paragraphs A-A7, wherein the outer tool is more resilient than the inner tool.

A9. The system of any of paragraphs A-A8, wherein the outer tool is constructed of one or more of Polytetrafluoroethylene, ultra-high-molecular-weight polyethylene, and silicone.

A10. The system of any of paragraphs A-A9, wherein the outer tool is self-lubricating.

A11. The system of any of paragraphs A-A10, wherein the inner tool is constructed of a metal, and optionally of aluminum.

A12. The system of any of paragraphs A-A11, wherein the outer tool is configured to operatively engage the inner faces of the open cell when the outer tool is operatively positioned within the open cell.

A12.1 The system of paragraph A12, wherein the outer tool is configured to operatively seal against the inner faces of the open cell when the outer tool is operatively positioned within the open cell.

A12.1.1 The system of paragraph A12.1, wherein the system is free of one or more sealing members that is separate and distinct from the outer tool (e.g., that would form a seal between the outer tool and the inner faces of the open cell when the outer tool is operatively positioned within the open cell).

A13. The system of any of paragraphs A-A12.1.1, wherein the outer tool is configured to not engage the edges of the open cell when the outer tool is operatively positioned within the open cell, thereby defining voids between the outer tool and the inner faces along the edges.

A14. The system of any of paragraphs A-A13, wherein the pathway of the outer tool includes channels that fluidly interconnect the cavity of the outer tool to corners of the open cell when the outer tool is operatively positioned within the open cell.

A15. The system of any of paragraphs A-A14, wherein the outer tool has a perpendicular cross-sectional outer profile that generally corresponds to a perpendicular cross-sectional profile of the open cell.

A15.1 The system of paragraph A15, wherein the perpendicular cross-sectional outer profile of the outer tool is generally polygonal and optionally rectangular.

A15.2 The system of any of paragraphs A15-A15.1, wherein the perpendicular cross-sectional outer profile of the outer tool is generally polygonal with rounded or truncated vertices that extend along 20%, 40%, 60%, 80%, or 100% and/or for less than 20%, 40%, 60%, 80%, or 100% of a length of the outer tool.

A15.2.1 The system of paragraph A15.2, wherein when the outer tool is operatively positioned within the open cell, the rounded or truncated vertices define voids between the outer tool and adjacent inner faces of the open cell with the voids extending from the back skin along 20%, 40%, 60%, 80%, or 100% and/or for less than 20%, 40%, 60%, 80%, or 100% of a depth of the open cell.

A15.3 The system of paragraph A15.2.1 or any of paragraphs A13-A15.2 when depending from paragraph A13, wherein the voids are fluidly interconnected with the pathway of the outer tool and the conduit of the inner tool when the outer tool is operatively positioned within the open cell and the inner tool is operatively positioned within the cavity of the outer tool.

A15.4 The system of any of paragraphs A15.2.1-A15.3, further comprising:
a pneumatic arrangement configured to facilitate selective delivery of adhesive from the conduit of the inner tool through the pathway of the outer tool to the voids.

A15.4.1 The system of paragraph A15.4, wherein the pneumatic arrangement is configured to selectively decrease air pressure within the voids to selectively draw adhesive into the voids.

A15.4.2 The system of any of paragraphs A15.4-A15.4.1, wherein the outer tool defines a plurality of passages configured to selectively interconnect the pneumatic arrangement with the voids, wherein the passages are distinct from the cavity and the pathway of the outer tool.

A15.4.3 The system of any of paragraphs A15.4-A15.4.2, wherein the pneumatic arrangement is further configured to selectively facilitate the outer tool sealing against the inner faces of the open cell when the outer tool is operatively positioned within the open cell.

A15.4.4 The system of any of paragraphs A15.4-A15.4.3, wherein the pneumatic arrangement is further configured to facilitate removal of the outer tooling from the open cell.

A15.4.4.1 The system of paragraph A15.4.4, wherein the pneumatic arrangement is configured to selectively increase air pressure within the voids when the outer tool is operatively positioned within the open cell to facilitate removal of the outer tooling from the open cell.

A15.4.5 The system of any of A15.4-A15.4.4.1, wherein the pneumatic arrangement and the adhesive source share a common housing.

A16. The system of any of paragraphs A-A14.5, wherein the structural back skin and the core define a plurality of open cells, and wherein the system comprises:
a plurality of outer tools, each outer tool configured to be inserted into a respective open cell; and
a plurality of inner tools corresponding to the outer tools, each inner tool configured to be inserted in a cavity of a respective outer tool.

A16.1 The system of paragraph A16, wherein the outer tools are coupled together as a single tooling member, optionally in a rectangular array.

A16.2 The system of any of paragraphs A16-A16.1, wherein the inner tools are coupled together as a single tooling member, optionally in a rectangular array.

A16.3 The system of any of paragraphs A16-A16.2, further comprising:
a tooling frame that defines a plurality of openings that correspond to at least a subset of the open cells, wherein the tooling frame is configured to be selectively positioned adjacent to the core opposite the structural back skin with the openings in alignment with the at least a subset of the open cells, and wherein the openings are configured to selectively receive the outer tools for precise insertion of the outer tools into the at least a subset of the open cells.

A16.3.1 The system of paragraph A16.3, wherein the openings have perpendicular cross-sectional profiles that correspond with perpendicular cross-sectional profiles of the open cells and with perpendicular cross-sectional outer profiles of the outer tools.

A16.3.2 The system of any of paragraphs A16.3-A16.3.2, wherein the openings are further configured to selectively receive the outer tools for insertion of the outer tools into the open cells without distortion of the core relative to the structural back skin.

A16.3.3 The system of any of paragraphs A16.3-A16.3.2, wherein the tooling frame is configured to selectively maintain appropriate positioning of the core relative to the structural back skin and the outer tools relative to the open cells.

A17. The system of any of paragraphs A-A16.3.3, further comprising:
a pressure distribution plate configured to selectively and operatively urge the outer tool(s) into operative engagement with the structural back skin.

A17.1 The system of paragraph A17, wherein the pressure distribution plate is configured to selectively engage and push against the inner tool(s).

A17.2 The system of any of paragraphs A17-A17.1, wherein the pressure distribution plate defines an engagement region(s) that is configured to selectively receive and mate with a portion of the inner tool(s).

A17.3 The system of any of paragraphs A17-A17.2, wherein the adhesive source includes the pressure distribution plate, and optionally (when depending from any of paragraphs A15.2.1.2-A15.2.1.2.5) wherein the pneumatic arrangement includes the pressure distribution plate.

A17.4 The system of any of paragraphs A17-A17.3, wherein the pressure distribution plate and the inner tool(s) are coupled together as a single tooling member.

A18. The system of any of paragraphs A-A17.4, further comprising:

a heating arrangement configured to selectively heat the outer tool(s) for selective expansion of the outer tool(s) within the open cell(s) and sealing of the outer tool(s) against the inner faces of the open cell(s) when the outer tool(s) is operatively positioned within the open cell(s).

A18.1 The system of paragraph A18, wherein the heating arrangement is configured to heat the outer tool(s) by induction heating of the inner tool(s).

A19. The system of any of paragraphs A-A18.1, in combination with the structural back skin and the core of the conformal array.

A20. The use of the system of any of paragraphs A-A19.

A21. A conformal array assembled by the system of any of paragraphs A-A19.

A22. An aircraft, vehicle, building, or other structure including a conformal array assembled by the system of any of paragraphs A-A19.

B. A conformal array manufacturing assembly, the assembly comprising:

a structural back skin;

a core connected to the structural back skin, wherein the core includes radiating elements, and wherein the core defines a plurality of open cells having edges defined by adjacent inner faces of the open cells;

a plurality of outer tools positioned within the open cells, wherein each outer tool defines a cavity and a pathway that fluidly interconnects the cavity to one or more corresponding edges of a corresponding open cell;

a plurality of inner tools positioned within the cavities of the outer tools, wherein each inner tool defines a conduit fluidly interconnected with the pathway of a respective outer tool; and an adhesive source operatively connected to the inner tools and configured to selectively deliver adhesive to the edges of the open cells via the conduits of the inner tools and the pathways of the inner tools.

B1. The assembly of paragraph B, further comprising the subject matter of any of paragraphs A-A18.1.

C. A method of assembling a conformal array, comprising:

positioning a core of the conformal array relative to and into engagement with a structural back skin of the conformal array, whereby the core and the structural back skin collectively define an open cell having edges defined by adjacent inner faces of the open cell;

inserting an outer tool into the open cell, wherein the outer tool defines a cavity and a pathway;

inserting an inner tool into the cavity of the outer tool, wherein the inner tool defines a conduit; and delivering adhesive to the edges of the open cell via the conduit of the inner tool and the pathway of the outer tool.

C1. The method of paragraph C, utilizing the system of any of paragraphs A-A19.

C2. The method of any of paragraphs C-C1, wherein the outer tool and/or the inner tool is as described in any of paragraphs A-A19.

C3. The method of any of paragraphs C-C2,
wherein the inserting the outer tool defines voids between the edges of the open cell and the outer tool; and
wherein the delivering includes drawing the adhesive along the voids via the pathway of the outer tool.

C3.1 The method of paragraph C3, wherein the drawing includes reducing air pressure within the voids.

C4. The method of any of paragraphs C-C3.1, wherein the inserting the outer tool includes engaging outer surfaces of the outer tool with the inner faces of the open cell, and optionally wherein the engaging includes sealing the outer surfaces of the outer tool with the inner faces of the open cell.

C5. The method of any of paragraphs C-C4, further comprising:

after the inserting the outer tool, expanding the outer tool such that outer surfaces of the outer tool engage the inner faces of the open cell, and optionally wherein the expanding includes sealing the outer surfaces of the outer tool with the inner faces of the open cell.

C5.1 The method of paragraph C5, wherein the expanding includes heating the outer tool, and optionally wherein the heating the outer tool includes heating the inner tool, and optionally wherein heating the inner tool includes induction heating the inner tool.

C6. The method of any of paragraphs C-C5.1, further comprising:

urging the outer tool toward the structural back skin and maintaining a pressure against the structural back skin during the delivering.

C6.1 The method of paragraph C6, wherein the urging includes pushing the inner tool against the outer tool.

C6.2 The method of any of paragraphs C6-C6.1, wherein the urging includes pushing the inner tool against the outer tool with a pressure distribution plate, and optionally wherein the pressure distribution plate includes an engagement region that mates with the inner tool.

C6.3 The method of any of paragraphs C6-C6.2, wherein the pressure distribution plate delivers the adhesive to the conduit of the inner tool.

C7. The method of any of paragraphs C-C6.3,
wherein the core and the structural array collectively define a plurality of open cells;
wherein the inserting an outer tool includes inserting a plurality of outer tools into at least a subset of the open cells;
wherein the inserting an inner tool includes inserting a plurality of inner tools into the cavities of the outer tools; and
wherein the delivering includes delivering adhesive to the edges of the open cells via the conduits of the inner tools and the pathways of the outer tools.

C7.1 The method of paragraph C7, wherein the outer tools are coupled together as a single tooling member, optionally in a rectangular array.

C7.2 The method of any of paragraphs C7-C7.1, wherein the inner tools are coupled together as a single tooling member, optionally in a rectangular array.

C7.3 The method of any of paragraphs C7-C7.2, further comprising:

prior to the inserting the outer tools, positioning a tooling frame adjacent to the core, wherein the tooling frame includes a plurality of openings that correspond to at least a subset of the open cells;
wherein the inserting the outer tools includes inserting the outer tools through the openings of the tool frame and into the open cells.

C7.3.1 The method of paragraph C7.3, wherein following the inserting the outer tools and during the delivering adhesive, the tooling frame maintains appropriate positioning of the core relative to the structural back skin and the outer tools relative to the open cells.

C7.4 The method of any of paragraphs C-C7.3.1,
wherein the open cells are in a rectangular array of X open cells by Y open cells;
wherein the plurality of outer tools includes less than X*Y outer tools, wherein the inserting the outer tools includes inserting the outer tools into a rectangular array of a subset of the open cells;

wherein the plurality of inner tools includes less than X*Y inner tools, wherein the inserting the inner tools includes inserting the inner tools into the rectangular array of the outer tools;

wherein the inserting the outer tools and the inserting the inner tools is repeated with a rectangular array of a separate and distinct subset of the open cells.

C8. The method of any of paragraphs C-C7.4, wherein the structural back skin includes a plurality of vias and wherein the core includes a plurality of projections corresponding to the vias, and wherein the positioning the core includes positioning the projections into the vias, the method further comprising:

after the positioning the core and prior to the inserting the outer tool, delivering conductive adhesive into the vias.

As used herein, the terms "selective" and "selectively," when modifying an action, movement, configuration, or other activity of one or more components or characteristics of an apparatus or step of a method, mean that the specific action, movement, configuration, or other activity is a direct or indirect result of user manipulation of an aspect of, or one or more components of, an apparatus.

As used herein, the term "configured" means that the element, component, or other subject matter is designed, constructed, and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, programmed, designed, and/or constructed for the purpose of performing the function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

For example, the systems 50 according to the present disclosure may be used or otherwise modified for use with the assembly of apparatuses other than conformal arrays. That is, the systems 50 may be used to operatively connect structure similar to a core 22 to structure similar to a structural back skin 20, with such structures being used in fields related to or wholly unrelated to conformal arrays.

The invention claimed is:

1. A system for assembling a conformal array, wherein the conformal array includes a structural back skin and a core connected to the structural back skin, wherein the core includes radiating elements that are electrically interconnected with a circuit board opposite the structural back skin, and wherein the structural back skin and the core collectively define an open cell having edges defined by adjacent inner faces of the open cell, the system comprising:

an adhesive source for supplying adhesive to the edges of the open cell;

an outer tool configured to be inserted into the open cell, wherein the outer tool defines a cavity and a pathway configured to distribute adhesive from the adhesive source to the edges of the open cell; and an inner tool configured to be inserted into the cavity of the outer tool, wherein the inner tool defines a conduit configured to receive adhesive from the adhesive source and to deliver adhesive to the pathway of the outer tool;

wherein the outer tool is configured to not engage the edges of the open cell when the outer tool is operatively positioned within the open cell, thereby defining voids between the outer tool and the inner faces along the edges;

wherein the outer tool has a perpendicular cross-sectional profile that is generally polygonal and that corresponds to a perpendicular cross-sectional profile of the open cell; and wherein the pathway of the outer tool includes channels that fluidly interconnect the cavity of the outer tool to vertices of the generally polygonal perpendicular cross-sectional profile of the outer tool and thus to corners of the open cell when the outer tool is operatively positioned within the open cell.

2. The system of claim 1, wherein the outer tool is constructed of a different material than the inner tool.

3. The system of claim 1, wherein the outer tool has a modulus of elasticity that is less than a modulus of elasticity of the inner tool, and wherein the modulus of elasticity of the outer tool is less 1 GPa.

4. The system of claim 1, wherein the outer tool has a volumetric coefficient of thermal expansion that is greater than a volumetric coefficient of thermal expansion of the inner tool, and the volumetric thermal coefficient of the outer tool is greater than one of $100 \times 10^{-6}/°$ C.

5. The system of claim 1, wherein the outer tool is more flexible than the inner tool.

6. The system of claim 1, wherein the outer tool is constructed of one or more of Polytetrafluoroethylene, ultra-high-molecular-weight polyethylene, and silicone, and wherein the inner tool is constructed of a metal.

7. The system of claim 1, wherein the outer tool is configured to operatively engage and seal against the inner faces of the open cell when the outer tool is operatively positioned within the open cell.

8. The system of claim 7, wherein the system is free of one or more sealing members that are separate and distinct from the outer tool.

9. The system of claim 1, wherein the structural back skin and the core define a plurality of open cells, and wherein the system comprises:

a plurality of outer tools, each outer tool configured to be inserted into a respective open cell; and a plurality of inner tools corresponding to the outer tools, each inner tool configured to be inserted in a cavity of a respective outer tool.

10. The system of claim 9, wherein the outer tools are coupled together in a rectangular array as a single tooling member.

11. The system of claim 9, wherein the inner tools are coupled together in a rectangular array as a single tooling member.

12. The system of claim 1, further comprising:

a pressure distribution plate configured to selectively and operatively urge the outer tool into operative engagement with the structural back skin.

13. The system of claim 1, wherein the voids are fluidly interconnected with the pathway of the outer tool and the conduit of the inner tool when the outer tool is operatively positioned within the open cell and the inner tool is operatively positioned within the cavity of the outer tool, and wherein the system further comprises:
- a pneumatic arrangement configured to facilitate selective delivery of adhesive from the conduit of the inner tool through the pathway of the outer tool to the voids, wherein the pneumatic arrangement is configured to selectively decrease air pressure within the voids to selectively draw adhesive into the voids.

14. The system of claim 13, wherein the pneumatic arrangement is further configured to facilitate removal of the outer tool from the open cell, wherein the pneumatic arrangement is configured to selectively increase air pressure within the voids when the outer tool is operatively positioned within the open cell to facilitate removal of the outer tool from the open cell.

15. The system of claim 1, further comprising:
- a heating arrangement configured to selectively heat the outer tool for selective expansion of the outer tool within the open cell and sealing of the outer tool against the inner faces of the open cell when the outer tool is operatively positioned within the open cell.

16. A system for assembling a conformal array, wherein the conformal array includes a structural back skin and a core connected to the structural back skin, wherein the core includes radiating elements that are electrically interconnected with a circuit board opposite the structural back skin, and wherein the structural back skin and the core collectively define an open cell having edges defined by adjacent inner faces of the open cell, the system comprising:
- an adhesive source for supplying adhesive to the edges of the open cell;
- an outer tool configured to be inserted into the open cell, wherein the outer tool defines a cavity and a pathway configured to distribute adhesive from the adhesive source to the edges of the open cell; and
- an inner tool configured to be inserted into the cavity of the outer tool, wherein the inner tool defines a conduit configured to receive adhesive from the adhesive source and to deliver adhesive to the pathway of the outer tool;
- wherein the outer tool is configured to not engage the edges of the open cell when the outer tool is operatively positioned within the open cell, thereby defining voids between the outer tool and the inner faces along the edges; and
- wherein the voids are fluidly interconnected with the pathway of the outer tool and the conduit of the inner tool when the outer tool is operatively positioned within the open cell and the inner tool is operatively positioned within the cavity of the outer tool, and wherein the system further comprises:
- a pneumatic arrangement configured to facilitate selective delivery of adhesive from the conduit of the inner tool through the pathway of the outer tool to the voids, wherein the pneumatic arrangement is configured to selectively decrease air pressure within the voids to selectively draw adhesive into the voids.

17. The system of claim 16, wherein the pneumatic arrangement is further configured to facilitate removal of the outer tool from the open cell, wherein the pneumatic arrangement is configured to selectively increase air pressure within the voids when the outer tool is operatively positioned within the open cell to facilitate removal of the outer tool from the open cell.

18. A system for assembling a conformal array, wherein the conformal array includes a structural back skin and a core connected to the structural back skin, wherein the core includes radiating elements that are electrically interconnected with a circuit board opposite the structural back skin, and wherein the structural back skin and the core collectively define a plurality of open cells each having edges defined by adjacent inner faces of a respective open cell, the system comprising:
- an adhesive;
- an adhesive source for supplying the adhesive to the edges of the open cells;
- a plurality of outer tools each configured to be inserted into a respective open cell, wherein the outer tools each define a cavity and a pathway configured to distribute the adhesive from the adhesive source to the edges of the respective open cell; and
- a plurality of inner tools corresponding to the plurality of outer tools, wherein each inner tool is configured to be inserted into a cavity of a respective outer tool, wherein each inner tool defines a conduit configured to receive the adhesive from the adhesive source and to deliver the adhesive to the pathway of the respective outer tool;
- a tooling frame that defines a plurality of openings that correspond to at least a subset of the open cells, wherein the tooling frame is configured to be selectively positioned adjacent to the core opposite the structural back skin with the openings in alignment with the at least a subset of the open cells, and wherein the openings are configured to selectively receive the outer tools for precise insertion of the outer tools into at least a subset of the open cells.

19. The system of claim 18, wherein the outer tools are constructed of a different material than the inner tools.

20. The system of claim 18, wherein the outer tools have a modulus of elasticity that is less than a modulus of elasticity of the inner tools, and wherein the modulus of elasticity of the outer tools is less 1 GPa.

21. The system of claim 18, wherein the outer tools have a volumetric coefficient of thermal expansion that is greater than a volumetric coefficient of thermal expansion of the inner tools, and the volumetric thermal coefficient of the outer tools is greater than one of $100 \times 10^{-6}/°$ C.

22. The system of claim 18, wherein the outer tools are more flexible than the inner tools.

23. The system of claim 18, wherein the outer tools are constructed of one or more of Polytetrafluoroethylene, ultra-high-molecular-weight polyethylene, and silicone, and wherein the inner tools are constructed of a metal.

24. The system of claim 18, wherein the outer tools are configured to operatively engage and seal against the inner faces of the open cells when the outer tools are operatively positioned within the open cells.

25. The system of claim 18, further comprising:
- a pressure distribution plate configured to selectively and operatively urge the outer tools into operative engagement with the structural back skin.

26. The system of claim 18, further comprising:
- a heating arrangement configured to selectively heat the outer tools for selective expansion of the outer tools within the open cells and sealing of the outer tools against the inner faces of the open cells when the outer tools are operatively positioned within the open cells.

27. A system for assembling a conformal array, wherein the conformal array includes a structural back skin and a core connected to the structural back skin, wherein the core includes radiating elements that are electrically interconnected with a circuit board opposite the structural back skin, and wherein the structural back skin and the core collectively define an open cell having edges defined by adjacent inner faces of the open cell, the system comprising:

the open cell;

an adhesive source for supplying adhesive to the edges of the open cell;

an outer tool configured to be inserted into the open cell, wherein the outer tool defines a cavity and a pathway configured to distribute adhesive from the adhesive source to the edges of the open cell;

an inner tool configured to be inserted into the cavity of the outer tool, wherein the inner tool defines a conduit configured to receive adhesive from the adhesive source and to deliver adhesive to the pathway of the outer tool; and a heating arrangement configured to selectively heat the outer tool for selective expansion of the outer tool within the open cell and sealing of the outer tool against the inner faces of the open cell when the outer tool is operatively positioned within the open cell.

28. A conformal array manufacturing assembly, the assembly comprising:

a structural back skin;

a core connected to the structural back skin, wherein the core includes radiating elements, and wherein the core defines a plurality of open cells having edges defined by adjacent inner faces of the open cells;

a plurality of outer tools positioned within the open cells, wherein each outer tool defines a cavity and a pathway that fluidly interconnects the cavity to one or more corresponding edges of the corresponding open cell;

a plurality of inner tools positioned within the cavities of the outer tools, wherein each inner tool defines a conduit fluidly interconnected with the pathway of a respective outer tool; and an adhesive source operatively connected to the inner tools and configured to selectively deliver adhesive to the edges of the open cells via the conduits of the inner tools and the pathways of the outer tools.

* * * * *